(12) United States Patent
Agireen et al.

(10) Patent No.: US 11,630,026 B2
(45) Date of Patent: Apr. 18, 2023

(54) METHOD AND TEST SYSTEM FOR ASSESSING THE QUALITY OF A MULTI-CHANNEL MICRO- AND/OR SUBWAVELENGTH-OPTICAL PROJECTION UNIT

(71) Applicant: SUSS MICROOPTICS SA, Hauterive (CH)

(72) Inventors: Isabel Agireen, Garching (DE); Katrin Schindler, Garching (DE); Wilfried Noell, Garching (DE); Sophiane Tournois, Garching (DE); Susanne Westenhoefer, Garching (DE)

(73) Assignee: SUSS MICROOPTICS SA

( * ) Notice: Subject to any disclaimer, the term of this patent is extended or adjusted under 35 U.S.C. 154(b) by 219 days.

(21) Appl. No.: 17/010,553

(22) Filed: Sep. 2, 2020

(65) Prior Publication Data

US 2021/0063863 A1 Mar. 4, 2021

(30) Foreign Application Priority Data

Sep. 2, 2019 (NL) ...................................... 2023747

(51) Int. Cl.
*G01M 11/02* (2006.01)
*G01B 11/14* (2006.01)
(Continued)

(52) U.S. Cl.
CPC ......... *G01M 11/0278* (2013.01); *G01B 11/14* (2013.01); *G01B 11/24* (2013.01);
(Continued)

(58) Field of Classification Search
CPC ............. G01M 11/02; G01M 11/0207; G01M 11/0214; G01M 11/0221; G01M 11/0228;
(Continued)

(56) References Cited

U.S. PATENT DOCUMENTS 5,286,338 A * 2/1994 Feldblum ................ C03C 15/00
252/79.1
8,491,128 B2 * 7/2013 Wu ....................... H04N 9/3185
353/69

(Continued)

FOREIGN PATENT DOCUMENTS

CN 102494873 A * 6/2012
DE 103 48 509 5/2005 ............ G01M 11/02

(Continued)

OTHER PUBLICATIONS

P.H. Nussbaum et al.: "Design, fabrication and testing of microlens arrays for sensors and microsystems", Pure and Applied Optics, Journal of the European Optical Society, Part A, Institute of Physics Publishing, Bristol, GB, Nov. 1997.

(Continued)

*Primary Examiner* — Gordon J Stock, Jr.
(74) *Attorney, Agent, or Firm* — Hayes Soloway P.C.

(57) ABSTRACT

A method for assessing the quality of a multi-channel micro- and/or subwavelength-optical projection unit is disclosed. The method comprises the following steps: At least a predefined portion of the optical projection unit is illuminated so that an image is generated by at least two channels of the predefined portion of the multi-channel optical projection unit. At least one characteristic quantity is determined based on the analysis of the image, wherein a value of the characteristic quantity is associated with a characteristic feature of the projection unit, a defect of the projection unit and/or a defect class of the projection unit. The quality of the projection unit is assessed based on the at least one characteristic quantity. Moreover, a test system for assessing the quality of a multi-channel micro- and/or subwavelength-optical projection unit and a computer program are disclosed.

15 Claims, 3 Drawing Sheets

(51) Int. Cl.
*G01B 11/24* (2006.01)
*G01N 21/896* (2006.01)
*G01N 21/958* (2006.01)

(52) U.S. Cl.
CPC .... *G01M 11/0221* (2013.01); *G01M 11/0257* (2013.01); *G01N 21/896* (2013.01); *G01N 2021/9583* (2013.01)

(58) Field of Classification Search
CPC ......... G01M 11/0235; G01M 11/0242; G01M 11/025; G01M 11/0257; G01M 11/0264; G01M 11/0271; G01M 11/0278; G01M 11/0285; G01B 11/14; G01B 11/24; G01B 11/255; G01B 11/30; G01B 11/303; G01B 11/306; G01N 21/88; G01N 21/8803; G01N 21/896; G01N 21/94; G01N 21/95; G01N 21/95692; G01N 21/958; G01N 2021/8962; G01N 2021/8965; G01N 2021/8967; G01N 2021/9511; G01N 2021/9513; G01N 2021/9583; G01N 2021/9586

See application file for complete search history.

(56) References Cited

U.S. PATENT DOCUMENTS

| | | | | |
|---|---|---|---|---|
| 10,469,812 | B2 * | 11/2019 | Ouchi | H04N 9/3182 |
| 10,976,152 | B2 * | 4/2021 | Cheng | G01B 9/0201 |
| 2003/0063789 | A1 | 4/2003 | Kitabayashi | 382/141 |
| 2007/0047801 | A1 * | 3/2007 | Kojima | G06T 7/0004 |
| | | | | 382/149 |
| 2008/0151266 | A1 * | 6/2008 | Morikuni | G01M 11/0264 |
| | | | | 359/443 |
| 2009/0251689 | A1 | 10/2009 | Ma et al. | 356/124 |
| 2010/0014778 | A1 * | 1/2010 | Imai | H04N 9/3185 |
| | | | | 382/275 |
| 2011/0210987 | A1 * | 9/2011 | Furui | H04N 9/3185 |
| | | | | 345/682 |
| 2011/0211064 | A1 * | 9/2011 | Furui | H04N 9/3147 |
| | | | | 348/135 |
| 2015/0084992 | A1 * | 3/2015 | Wada | G06T 3/20 |
| | | | | 345/682 |
| 2019/0206027 | A1 * | 7/2019 | Uemura | H04N 21/440263 |
| 2020/0007834 | A1 * | 1/2020 | Uemura | H04N 9/3147 |
| 2020/0329221 | A1 * | 10/2020 | Chien | H04N 9/3185 |

FOREIGN PATENT DOCUMENTS

| | | | | |
|---|---|---|---|---|
| DE | 10 2017 118 355 | | 2/2019 | ............. G01B 11/25 |
| JP | 59224537 | A * | 12/1984 | |
| JP | 2008170325 | A * | 7/2008 | |
| JP | 2008171142 | A * | 7/2008 | |
| KR | 101396959 | B1 * | 5/2014 | |
| KR | 20140146903 | A * | 12/2014 | |
| KR | 20150099956 | A * | 9/2015 | |
| KR | 20160149883 | A * | 12/2016 | |
| KR | 20180030297 | A * | 3/2018 | |
| WO | WO-2016207703 | A1 * | 12/2016 | ............. G09G 3/006 |

OTHER PUBLICATIONS

P.D. Pulaski: "Lenslet arrays measure aberrations in like devices", Laser Focus World, Dec. 2002, XP055693644.

* cited by examiner

METHOD AND TEST SYSTEM FOR ASSESSING THE QUALITY OF A MULTI-CHANNEL MICRO- AND/OR SUBWAVELENGTH-OPTICAL PROJECTION UNIT

FIELD OF THE DISCLOSURE

The disclosure relates to a method for assessing the quality of a multi-channel micro- and/or subwavelength-optical projection unit. The disclosure further relates to a test system for assessing the quality of a multi-channel micro- and/or subwavelength-optical projection unit as well as to a computer program for performing the method.

BACKGROUND

Micro-optical projection units and subwavelength-optical projection units typically comprise several micro-optical elements and/or subwavelength-optical elements, respectively. Typically, the projection units comprise several hundred or several thousand of these optical elements, wherein the diameter of the individual optical elements typically is smaller than 1 mm (micro-optical projection unit), in particular smaller than 1 µm (subwavelength-optical projection unit), and may be of the order of several nanometers.

Compared to classical optics, the production techniques of micro-optical and/or subwavelength-optical equipment can be vastly different, as the required package density of optically active elements is considerably higher.

In the production of the projection units, deviations in one or several production process parameters may occur. For example, the size, curvature and/or position of the optical elements may vary due to tolerances and process variations. Particularly, the distance between individual optical elements may vary.

Moreover, there may be pinholes in the wafer leading to transmission of light through the projection unit in regions outside of the optical elements.

In general, there is a high demand on the positioning accuracy of the individual optical elements of the projection units and also on other defects like the pinholes mentioned above.

However, depending on the application of the projection unit, defects may be tolerable up to a certain degree. Thus, the quality of the projection units needs to be assessed in order to guarantee that the respective quality criteria are met by the projection unit.

SUMMARY

Thus, there is the need to provide a method as well as a system for assessing the quality of micro- and/or subwavelength-optical projection units.

Thus, there is provided a method for assessing the quality of a multi-channel micro- and/or subwavelength-optical projection unit. The method comprises the following steps: At least a predefined portion of the micro- and/or subwavelength-optical projection unit is illuminated so that an image is generated by at least two channels of the predefined portion of the multi-channel micro- and/or subwavelength-optical projection unit. The image is captured and analyzed. At least one characteristic quantity is determined based on the analysis of the image, wherein a value of the characteristic quantity is associated with at least one characteristic feature of the projection unit, at least one defect of the projection unit and/or at least one defect class of the projection unit. The quality of the projection unit is assessed based on the at least one characteristic quantity.

Subwavelength-optical elements, in particular subwavelength-lenses may also be called nano-optical elements, in particular nano-lenses.

The disclosure is based on the finding that defects of the projection unit are directly linked to certain defects in the image generated by the projection unit. For example, deviations in the positions of optically active regions of the projection unit and deviations from a desired curvature of the individual optically active regions, and/or pinholes in the wafer each lead to respectively associated characteristic defects in the image.

Further, undesired pinholes in the projection unit cause bright circular spots in the image; unintentional misalignments during the manufacturing process lead to unsharp contours; Mechanical defects on lenses (e.g. scratches and/or cracks) lead to circular black rings and/or dark spots; undesired contaminations in the manufacturing process lead to dark freckles (dark spots), e.g. ununiformities in the pattern.

By analyzing the defects in the image generated by the projection unit, the quality of the projection unit can be assessed in a particularly fast and convenient fashion by applying image processing techniques to the captured image. From the state of the art, many different well-elaborated image processing techniques are known.

The image that is generated by at least the predefined portion of the projection unit, captured and subsequently analyzed may be the same image the projection unit will generate during its intended or parts thereof.

Alternatively or in addition, the image to be captured and analyzed may be generated by illuminating at least the predefined portion in the same way as during the intended use of the projection unit.

The projection unit is, for example, configured to create a projection of a motif on a surface, in particular a surface in a predefined arrangement with respect to the projection unit.

According to an aspect of the disclosure, the at least one characteristic quantity comprises at least one of sharpness, dark level, uniformity, brightness fluctuations and local defects. It has turned out that these quantities are especially suitable for assessing the quality of the projection unit, as they are directly associated with specific defects that may typically occur during the production of the projection unit.

According to a further aspect of the disclosure, the micro-optical projection unit is categorized into one of at least two quality classes based on the at least one characteristic quantity. Thus, the projection unit may be categorized into one of exactly two classes, e.g. "quality test passed" or "quality test not passed". Alternatively, the projection unit may be categorized into one of several classes, such as "grade A", "grade B", etc. Each of the classes is associated with certain quality requirements that have to be met, particularly certain thresholds for one or several of the characteristic quantities that have to be met.

In a further embodiment of the disclosure the projection unit comprises several micro- and/or subwavelength-optical elements, in particular micro-lenses and/or subwavelength-lenses, particularly wherein the optical elements have a size, a curvature, a masking and/or a position in the projection unit, the size, the curvature and/or the position being at least one of the at least one characteristic feature of the projection unit. Deviations in the positions of the optical elements and/or deviations from a desired curvature of the individual optical elements are associated with specific defects in the captured image. By implication, defects in the captured image can be linked to defects of the projection unit and/or of the optical elements, such that the defects in the captured image can be used to assess the quality of the projection unit.

Generally speaking, each of the optical elements is configured to diffract, refract and/or guide light in a predetermined way. Thus, optical elements having diffracting, refracting and/or guiding properties can be implemented on the same projection unit, in particular on a common substrate.

At least some of the optical elements, particularly all optical elements may be established identically to one another. Likewise, at least some of the optical elements, particularly all optical elements may be established differently from one another, i.e. the optical elements may differ e.g. in size and/or curvature.

The projection unit may comprise at least one additional mechanical feature, e.g. a spacer and/or at least one protrusion. The spacer and/or the at least one protrusion may serve to set a distance between the projection unit and a respective further component during use of the projection unit.

Particularly, a geometric feature of the spacer and/or of the at least one protrusion may be a characteristic quantity of the projection unit. For example, a height, width and/or depth of the spacer and/or of the at least one protrusion may be a characteristic quantity of the projection unit.

Particularly, the optical elements form an array, the array having a distance between two neighboring optical elements being at least one of the at least one characteristic feature of the projection unit. The distance may be the minimal distance between the individual neighboring optical elements, the maximal distance between the individual neighboring optical elements and/or the average distance between the individual neighboring optical elements.

In another embodiment of the disclosure, the quality of the projection unit is assessed during manufacturing of the projection unit, in particular end-of-line. Preferably, the quality assessment is repeated after several intermediate steps of the manufacturing of the projection unit. Based on the assessment of the quality during the manufacturing, the projection unit may be discarded in an earlier stage of the manufacturing if necessary, thereby saving production time and production resources.

According to another aspect of the disclosure, manufacturing parameters, in particular at least one of the characteristic features, are adapted based on the quality assessment of the projection unit. Thus, the process parameters can be adapted such that the quality of the projection unit is enhanced. In other words, possible mistakes and/or deviations can be accounted for during the production, thereby attenuating the effect of these production deviations.

Manufacturing parameters that may be adapted are, for example, the baselayer thickness of the projection unit, the lens shape and/or the lens curvature.

Preferably, the image of projection unit is analyzed via a statistical method and/or via a machine learning module, in particular wherein the machine learning module comprises a pre-trained artificial neural network. In other words, the image may be analyzed with a purely classical, deterministic method that is based on classical algorithms, i.e. computational rules. On the other hand, the image may be analyzed solely via a machine learning method, or via a mixture of both.

The machine learning module may be pre-trained with labelled training data, wherein the labelled training data comprises sample images generated by the predefined portion of a sample optical projection unit, and wherein the labelled training data comprises the at least one characteristic quantity corresponding to the respective sample images and/or the quality class of the respective sample projection unit. Thus, the machine learning module is pre-trained in a supervised fashion.

Preferably, the machine learning module comprises an artificial neural network, for example a convolutional neural network (CNN) and/or a recurrent neural network (RNN) that is pre-trained to analyze the image, determine the at least one characteristic quantity and/or assess the quality of the projection unit.

Alternatively, the machine learning module may be pre-trained in a semi-supervised fashion with partially labelled data or in an unsupervised fashion.

According to a further aspect of the disclosure, the at least one characteristic quantity corresponding to the respective sample images is obtained by applying the statistical method to the sample images. Thus, the sample image is first analyzed via the classical statistical approach, wherein the result of the statistical analysis yields the label for the respective image.

In other words, the statistical approach is performed for a limited set of sample images. The sample images and the result of the statistical analysis form the training data for the machine learning module. Thus, the statistical method may only be applied to this limited training set in order to train the machine learning module, while the quality assessment during manufacturing of the projection unit is performed via the machine learning module.

According to the disclosure, the problem is further solved by a test system for assessing the quality of a multi-channel micro- and/or subwavelength-optical projection unit, comprising an illumination unit, an image capturing device, an image analysis module and a control module, wherein the control module is configured to cause the test system to perform the method described above. Regarding the advantages and features of the test system, reference is made to the explanations given above regarding the method, which also hold for the test system and vice versa.

According to an aspect of the disclosure, the test system comprises a device under test, particularly wherein the device under test is a multi-channel micro- and/or subwavelength-optical projection unit. Generally speaking, the device under test is a substrate, like a wafer comprising one or several multi-channel micro- and/or subwavelength-optical projection units. Particularly, the device under test may be established as a single projection unit.

According to the disclosure, the problem is further solved by a computer program comprising instructions which, when the program is executed by a processing unit of the control module of the test system described above, cause the test system to carry out the steps of the method described above. Regarding the advantages and features of the computer program, reference is made to the explanations given above regarding the method, which also hold for the computer program and vice versa.

Therein and in the following, the term "instructions" is understood to mean instructions in the form of program code and/or program code modules in compiled and/or in uncompiled form, wherein the instructions can be established in any programming language and/or in machine language.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than two items.

Figure 1:
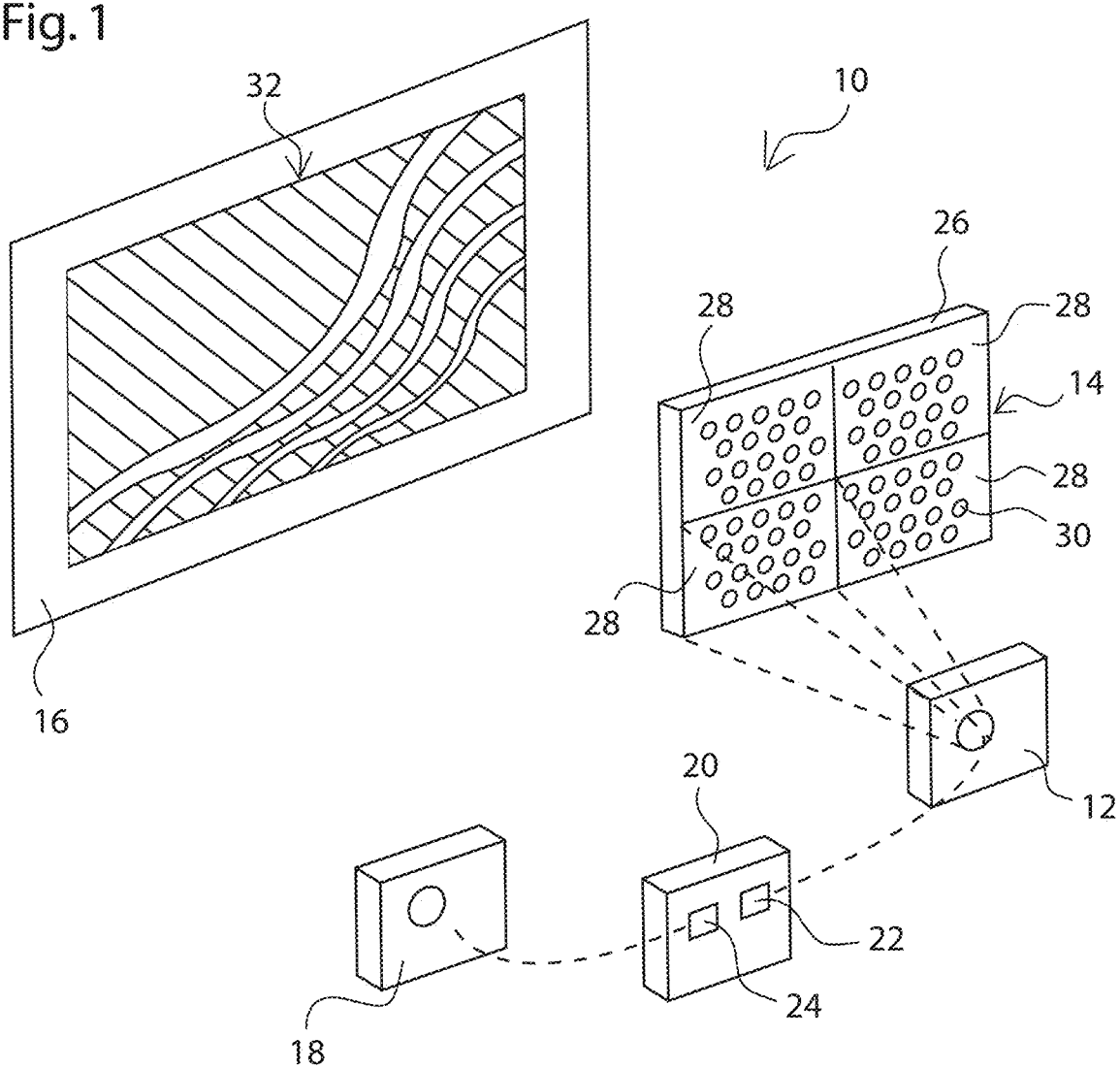
FIG. 1 schematically shows a test system according to the disclosure.

FIG. 1 schematically shows a test system 10 comprising an illumination unit 12, a device under test 14, a screen 16 and an image capturing device 18.

The test system 10 further comprises a control- and analysis unit 20 with a control module 22 and an image analysis module 24, wherein the control- and analysis unit 20 is connected to both the illumination unit 12 and the image capturing device 18 in a signal transmitting manner.

The device under test 14 is a substrate 26 comprising several multi-channel micro- and/or subwavelength-optical projection units 28. In the case shown in FIG. 1, the substrate 26 comprises four projection units 28. However, this number is solely for illustration purposes. The substrate 26 may also comprise any other number of projection units 28.

Particularly, the device under test 14 may be established as a single projection unit 28.

The projection units 28 each comprise several micro- and/or subwavelength-optical elements 30. The projection units 28 may each comprise between ten and 1000 optical elements 30, in particular between 30 and 500 optical elements 30, for example between 50 and 300 optical elements 30.

A diameter of the individual optical elements 30 may be smaller than 1 mm in micro-optical projection units 28, or smaller than 1 μm in subwavelength-optical projection units 28, and may be of the order of several nanometers.

A region between the optical elements 30 is opaque, such that light can only pass through the projection units through the optical elements 30.

Generally speaking, each of the optical elements 30 is configured to refract, diffract and/or guide light in a predefined way. In other words, each of the optical elements 30 provides a channel of the multi-channel projection unit 28.

More specifically, the optical elements 30 each have a predefined size, a predefined curvature and/or are provided with a masking such that the desired optical properties of the individual optical elements 30 are obtained.

The optical elements 30 may have a masking configured to create a projection of a motif on a surface. The location of the surface with respect to the projection unit 28 is known. For example, the projection unit 28 is mounted in a door of a car and the optical elements 30 have a masking so that a projection of an emblem of the car's manufacturer is generated on the road surface beside the car, when the projection unit 28 is illuminated.

Therein, at least some of the optical elements 30, particularly all optical elements 30 may be established identically to one another. Likewise, at least some of the optical elements 30, particularly all optical elements 30 may be established different from one another, i.e. may differ e.g. in size, curvature and/or marking.

The optical elements 30 are arranged in a predetermined fashion in the respective projection unit 28 depending on the particular field of application of the projection unit 28.

More precisely, the optical elements 30 are arranged such that a desired image 32 is obtained behind the projection unit 28 when the projection unit 28 is illuminated.

The optical elements 30 are distributed according to a predefined pattern over the area of the projection unit 28. This is illustrated in FIG. 1, where the image 32 generated by illuminating one of the projections units 28 is captured on the screen 16.

In other words, the optical elements 30 form a multi-channel micro- and/or subwavelength-optical array that is configured to generate an image 32 with predefined properties when illuminated. Therein, the images generated by the individual optical elements 30—which may also be called "beamlets"—are superposed, which leads to a statistical mixing of the images generated by the individual optical elements 30.

Alternatively, the optical elements 30 may be distributed randomly over the area of the respective projection unit 28.

Figure 2:
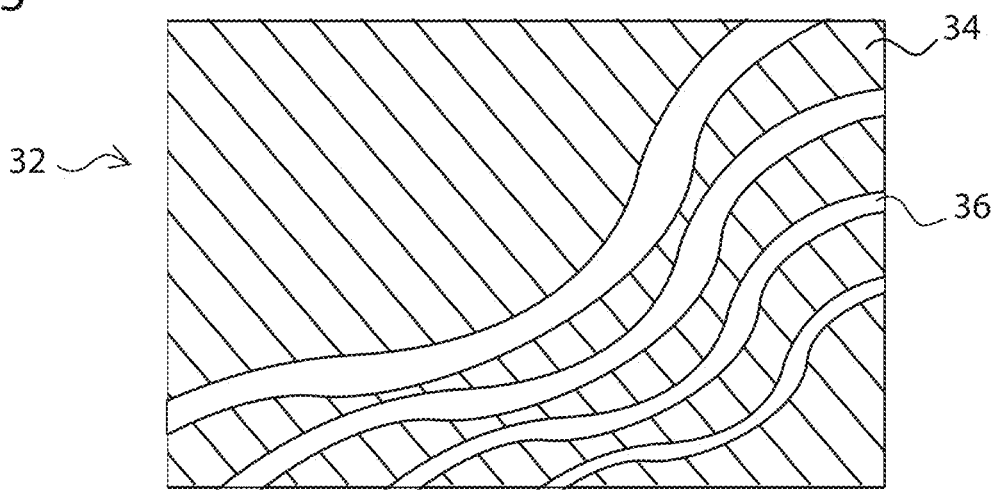
FIG. 2 shows a detailed view of an image generated by a projection unit according to the disclosure.

FIG. 2 shows the generated image 32 in more detail. The image 32 comprises dark areas 34 and illuminated areas 36. In the specific example of FIG. 2, the illuminated areas 36 are stripes that each comprise two straight portions being connected to one another by a curved portion.

In the production of the projection units 28, deviations in one or several process parameters may occur. For example, the size, curvature and/or position of the optical elements 30 may vary due to tolerances and process variations. Particularly, the distance between individual optical elements 30 may vary.

Moreover, there may be defects, like pinholes in the wafer 26 leading to transmission of light through the projection unit 28 in regions outside of the optical elements 30.

Depending on the application of the projection unit 28, such defects may be tolerable up to a certain degree. Thus, the quality of the projection units 28 needs to be assessed in order to guarantee that the respective quality criteria are met by the projection unit 28.

Figure 3:
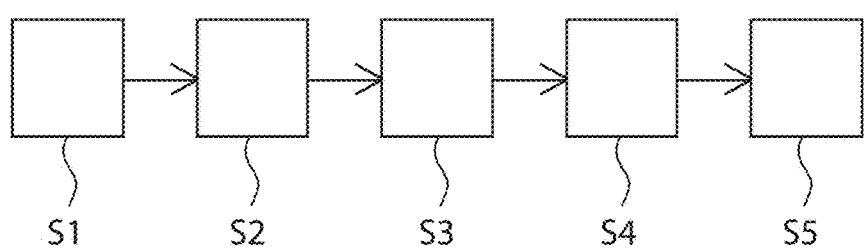
FIG. 3 shows a schematic flow chart of a method for assessing the quality of a multi-channel micro- and/or sub-wavelength-optical projection unit according to the disclosure.

The test system 10 is configured to perform a method for assessing the quality of the projection units 28, which is described in the following with reference to FIG. 3.

More precisely, a computer program is executed on a central processing unit of the control- and analysis unit 20 that causes the test system 10 to perform the method described in the following.

First, at least a predefined portion of at least one of the projection units 28 is illuminated by the illumination unit 12 (step S1). For example, one of the projection units 28 is fully illuminated while the other projection units on the wafer 26 are not illuminated.

Alternatively, only a certain portion of one of the projection units 28 may be illuminated, for example a portion having a certain structure of optical elements 30 whose quality is to be assessed.

Alternatively, several projection units 28 may be illuminated simultaneously.

Without loss of generality, the case where one of the projection units 28 is completely illuminated is described in the following.

Due to the illumination of the projection unit 28 an image is generated by the projection unit 28 and projected onto the screen 16. In other words, the image 32 is generated by the projection unit 28 and projected onto the screen 16.

The image that is generated by at least the predefined portion of the projection unit 28 may be the same image, or parts thereof, the projection unit 28 will generate during its intended use.

Alternatively or in addition, the image may be generated by illuminating the at least predefined portion of the projection unit 28 in the same way as during the intended use of the projection unit 28.

The image generated by the projection unit 28 is then captured via the image capturing device 18 (step S2). Generally speaking, the captured image is a digital representation of the generated image 32, wherein the captured image comprises several pixels each having a brightness value and/or a color value.

For example, the image capturing device 18 may be established as a camera, particularly as a high-resolution camera.

It is also conceivable that the image capturing device 18 is integrated into the screen 16. For example, the screen 16 may comprise photo-sensitive elements that are configured to capture the image generated by the projection unit 28.

The captured image is then forwarded to the control- and analysis unit 20, more precisely to the image analysis module 24, and analyzed by the image analysis module 24 (step S3).

The image analysis module 24 then determines at least one characteristic quantity of the captured image based on the analysis of the image (step S4).

Generally speaking, the at least one characteristic quantity is associated with the quality of the projection unit 28. This is due to the fact that defects of the wafer 26 and/or defects of the optical elements 30 manifest in associated defects in the image, i.e. defects in the generated image 32.

For example, deviations in the positions of the individual optical elements 30, deviations from a desired curvature of the individual optical elements 30 and/or pinholes in the wafer 26 each lead to respectively associated characteristic defects in the image.

It has turned out that there are several main image characteristics that are well suited for assessing the quality of the projection unit 28, namely sharpness, dark level and uniformity, wherein the uniformity in turn comprises brightness fluctuations, background fluctuations and local defects. A more detailed definition of these image characteristics will be given below.

Accordingly, the at least one characteristic quantity may comprise one or more of the following quantities: sharpness, dark level, uniformity, brightness fluctuations, background fluctuations, local defects, curvature of the individual optical elements 30, minimal distance between the individual optical elements 30, maximal distance between the individual optical elements 30 and/or average distance between the individual optical elements 30.

The image analysis module 24 determines the at least one characteristic quantity via an analysis of the image that is based on a statistical method and/or a machine learning method.

In other words, the image may be analyzed with a purely classical, deterministic method that is based on classical algorithms, i.e. computational rules. On the other hand, the image may be analyzed solely using a machine learning method, or via a mixture of both.

The case of the statistical approach will be explained in more detail in the following with reference to FIGS. 4 to 6.

Figure 4:
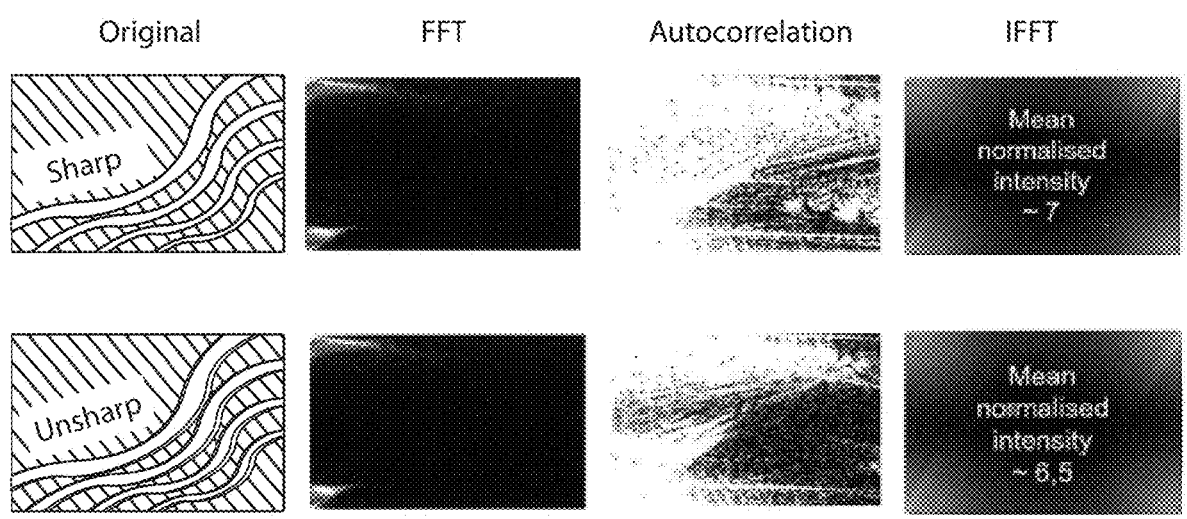
FIGS. 4 to 6 respectively show illustrations of individual steps of the method of FIG. 3.

FIG. 4 schematically shows the steps that are taken to determine the sharpness of the image.

In the first column of FIG. 4, two images having the same pattern are shown. However, the image in the first line is sharp while the image in the second line is unsharp.

A measure for the sharpness of the image is obtained by the following procedure: first, a fast Fourier transform of the image is determined (second column in FIG. 4). The Fourier transformed image is then auto-correlated (third column), and the inverse fast Fourier transform of the auto-correlated image is determined (fourth column).

A mean intensity, a normalized intensity and/or a mean normalized intensity of the result of the inverse Fourier transform is determined, which constitutes a measure for the sharpness of the original image. Therein, a higher mean intensity is associated with a sharper image while a lower mean intensity is associated with a less sharp image.

For normalization, for example, the highest value of the image is normalized with respect to the image height, image width, image mean value and/or image standard deviation.

Figure 5:
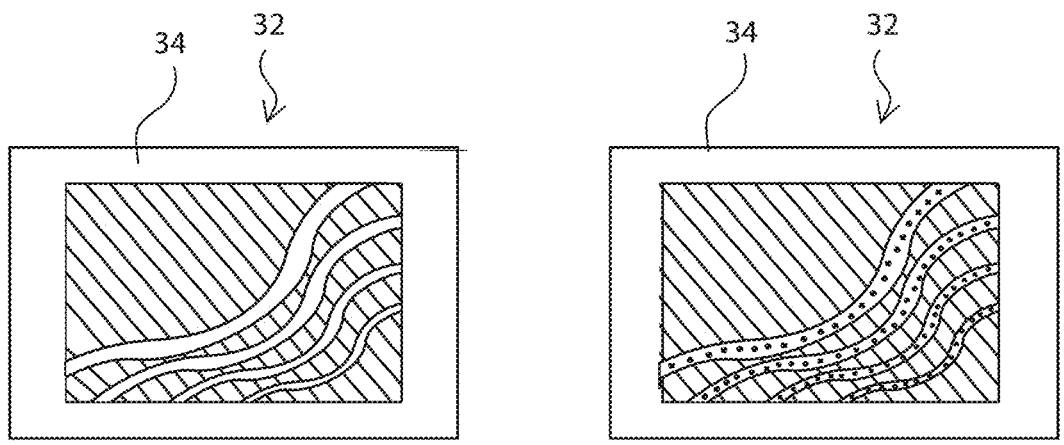

FIG. 5 shows the principal steps taken in order to obtain the characteristic quantity "dark level". Generally speaking, the dark level is measure for the brightness of those regions of the screen 16 that should not be illuminated. i.e. for the brightness of the dark areas 34.

The image on the left hand side of FIG. 5 shows the original image captured by the image capturing device 18.

For the determination of the dark level, a contrast threshold with respect to the background and/or a brightness threshold is set in order to distinguish the illuminated areas 36 from the dark areas 34 (background), as is illustrated in the image on the right-hand side of FIG. 5. In other words, each pixel of the captured image is categorized into either "illuminated" (dotted area) or "not illuminated" (hatched area).

Afterwards, an average brightness level of the pixels categorized as "not illuminated", i.e. an average brightness level and/or average contrast of the dark areas 34 is determined.

The dark level may be determined only for a specific region of the dark areas 34, i.e. for a so-called region of interest.

Figure 6:
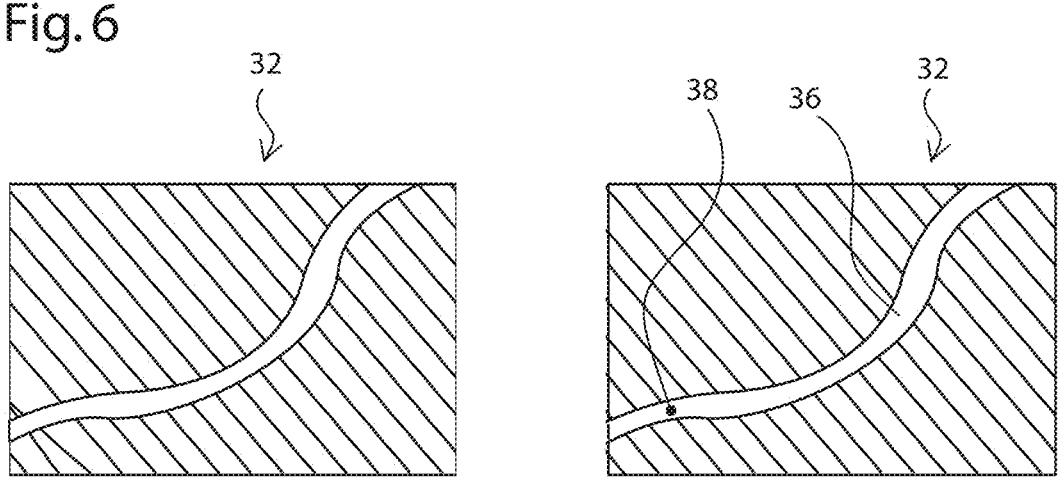

FIG. 6 illustrates how the characteristic quantity "uniformity" is determined.

First, the edges of the illuminated areas 36 are determined such that the individual illuminated area 36 can be individually analyzed. The result is shown on the left hand side of FIG. 6, where the uppermost stripe-shaped illuminated area 36 has been isolated.

Then, a mask filter 38 is applied to the isolated illuminated area 36, wherein the mask filter has a predetermined size and a predetermined brightness threshold. Generally speaking, the mask filter 38 determines the level of fluctuations of the brightness level within the predetermined size of the mask filter 38. Therein, the mask filter 38 is successively applied to the whole illuminated area 36.

In other words, the characteristic quantity "uniformity" constitutes a measure for local brightness fluctuations as well as background fluctuations within the illuminated areas 36, and thus a measure for local defects of the respective projection unit 28 and/or the respective optical elements 30.

Based on the at least one determined characteristic quantity, the projection unit 28 is categorized into one of at least two quality classes categories (step S5).

For this purpose, at least one predetermined quality criterion is set for at least one of the characteristic quantities, particularly for several or all of the characteristic quantities.

For example, the at least one predetermined criterion comprises a threshold for the sharpness of the image and/or a respective threshold for the remaining characteristic quantities.

The projection unit 28 may categorized into one of two classes, namely "quality test passed" and "quality test not passed".

For example, the respective projection unit 28 is categorized into the class "quality test not passed" if the at least one quality criterion is not met. Accordingly, the respective projection unit 28 is categorized into the class "quality test passed" if the at least one quality criterion is met.

Of course, there may be more than two quality classes. For example, the respective projection unit is categorized into one of the classes "grade A", "grade B" etc., depending on whether one or more of the quality criteria is met, and depending on which of the quality criteria is met.

Different applications of the projection unit 28 may have different demands on the quality of the projection unit 28. Thus, while a projection unit 28 categorized into the class "grade C" may be not suitable for one particular application requiring a high quality of the projection unit 28, there may be an application where the class "grade C" is sufficient. Thus, the projection unit 28 may not have to be discarded but may simply be allocated to a different application.

Preferably, the quality of the projection unit 28 is assessed during the manufacturing of the projection units 28.

Particularly, the quality of the projection unit 28 is assessed at the end of the production of the projection unit 28, i.e. end-of-line. The process parameters for the production line may be adapted based on the result of the assessment.

Alternatively, the quality of the projection unit 28 is repeatedly assessed after intermediate steps of the manufacturing of the projection unit 28. Based on the assessment of the quality, the respective projection unit 28 may be discarded in an earlier stage of the manufacturing if necessary, thereby saving production time and production resources.

If the projection unit 28 is not discarded due to the intermediate assessment of the quality, production process parameters for the further manufacturing may be adapted.

The explanations given above relate to steps S3 to S5 being executed via a classical statistical approach.

However, as already mentioned above, these steps may also be performed via a machine learning method.

More precisely, the control- and analysis unit 20 or rather the image analysis module 24 may comprise machine learning module that is configured to perform the steps S3 to S5 described above.

Therein, the machine learning module comprises an artificial neural network, for example a convolutional neural network (CNN) and/or a recurrent neural network (RNN) that is pre-trained to analyze the image, determine the at least one characteristic quantity, assess the quality of the respective projection unit 28 and/or assign the device under test 14 to a class.

Of course, any other suitable neural network type may be employed.

Moreover, the statistical approach and the machine learning approach may be combined.

Particularly, the machine learning module may be pre-trained with data that is obtained by assessing the quality of the projection unit 28 via the statistical approach.

More precisely, several sample images are analyzed via the statistical approach in the way described above. Thereby, labelled training data is obtained that comprises the sample images on one hand and the at least one characteristic quantity corresponding to the respective sample images and/or the quality class of the respective sample projection unit 28 on the other hand.

The machine learning module is fed with the labelled training data. The machine learning module determines the at least one characteristic quantity and/or categorizes the respective image into one of the quality classes.

Afterwards, weighting factors of the machine learning module or adjusted based on a deviation of the determined at least one characteristic quantity and/or determined quality class from an actual characteristic quantity and/or an actual quality class of the projection unit 28 that has been determined via the statistical approach.

Summarizing, the test system 10 is configured to assess the quality of individual or several projection units 28 during the production of the projection units 28. Based on the assessment of the quality, the individual projection units 28 are categorized into quality classes via a statistical approach, via a machine learning method, or via a combination of both.

Accordingly, the test system 10 provides a way to determine the suitability of individual projection units 28 for applications requiring certain quality characteristics.

The invention claimed is:

1. A method for assessing the quality of a projection unit being at least one of a multi-channel micro-optical projection unit and a multi-channel subwavelength-optical projection unit, comprising the following steps:

illuminating at least a predefined portion of the projection unit so that an image is generated by at least two channels of the predefined portion of the projection unit;

capturing the image generated by the predefined portion of the projection unit;

analyzing the image;

determining at least one characteristic quantity based on the analysis of the image, wherein a value of the characteristic quantity is related to at least one of at least one characteristic feature of the projection unit, at least one defect of the projection unit and at least one defect class of the projection unit; and assessing the quality of the projection unit based on the at least one characteristic quantity, wherein the image of the projection unit is analyzed via at least one of a statistical method and via a machine learning module, wherein the machine learning module comprises a pre-trained artificial neural network, wherein the machine learning module has been pre-trained with labelled training data, wherein the labelled training data comprises sample images generated by the predefined portion of a sample optical projection unit, and wherein the labelled training data comprises at least one of the at least one characteristic quantity corresponding to the respective sample images and the quality class of the respective sample projection unit, and wherein the at least one characteristic quantity corresponding to the respective sample images is obtained by applying the statistical method to the sample images.

2. The method according to claim 1, wherein the at least one characteristic quantity comprises at least one of sharpness, dark level, uniformity, brightness fluctuations and local defects.

3. The method according to claim 1, wherein the projection unit is categorized into one of at least two quality classes based on the at least one characteristic quantity.

4. The method according to claim 1, wherein the quality of the projection unit is assessed during manufacturing of the projection unit.

5. The method according to claim 4, wherein the quality of the projection unit is assessed during manufacturing of the projection unit at the end-of-line.

6. The method according to claim 4, wherein manufacturing parameters are adapted based on the quality assessment of the projection unit.

7. The method according to claim 6, wherein the manufacturing parameters are at least one of the characteristic features.

8. The method according to claim 1, wherein the projection unit comprises at least one of several micro-optical elements and several subwavelength-optical elements.

9. The method according to claim 8, wherein the several micro-optical elements are micro-lenses.

10. The method according to claim 8, wherein the several subwavelength-optical elements are subwavelength-lenses.

11. The method according to claim 8, wherein the optical elements have at least one of a size, a curvature, a masking and a position in the projection unit, the at least one of the size, the curvature and the position being at least one of the at least one characteristic feature of the projection unit.

12. The method according to claim 8, wherein the optical elements form an array, the array having a distance between two neighboring optical elements being at least one of the at least one characteristic feature of the projection unit.

13. A test system for assessing the quality of a projection unit being at least one of a multi-channel micro-optical projection unit and a multi-channel subwavelength-optical projection unit, comprising an illumination unit, an image capturing device, an image analysis module and a control module, wherein the control module is configured to cause the test system to perform a method according to claim 1.

14. The test system of claim 13, wherein the test system comprises a device under test.

15. The test system of claim 14, wherein the device under test is the projection unit.

* * * * *